(12) United States Patent
Yonezawa et al.

(10) Patent No.: US 11,017,924 B2
(45) Date of Patent: May 25, 2021

(54) THERMISTOR ELEMENT AND METHOD FOR MANUFACTURING SAME

(71) Applicant: MITSUBISHI MATERIALS CORPORATION, Tokyo (JP)

(72) Inventors: Takehiro Yonezawa, Naka (JP); Kazutaka Fujiwara, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/961,264

(22) PCT Filed: Jan. 15, 2019

(86) PCT No.: PCT/JP2019/000906
§ 371 (c)(1),
(2) Date: Jul. 10, 2020

(87) PCT Pub. No.: WO2019/139162
PCT Pub. Date: Jul. 18, 2019

(65) Prior Publication Data
US 2021/0065940 A1    Mar. 4, 2021

(30) Foreign Application Priority Data
Jan. 15, 2018 (JP) .............................. JP2018-004419

(51) Int. Cl.
*H01C 7/00* (2006.01)
*H01C 1/142* (2006.01)
*H01C 17/30* (2006.01)

(52) U.S. Cl.
CPC ............. *H01C 7/008* (2013.01); *H01C 1/142* (2013.01); *H01C 17/30* (2013.01)

(58) Field of Classification Search
CPC ...... H01C 7/008; H01C 1/142; H01C 17/281; H01C 17/30
See application file for complete search history.

(56) References Cited

U.S. PATENT DOCUMENTS 5,939,972 A * 8/1999 Nagao ...................... H01C 7/02
338/22 R
7,902,958 B2 * 3/2011 Kahr ....................... H01C 1/084
338/195

(Continued)

FOREIGN PATENT DOCUMENTS

| JP | 05-190091 A | 7/1993 |
| JP | 09-186002 A | 7/1997 |

(Continued)

OTHER PUBLICATIONS

International Search Report dated Apr. 9, 2019, issued for PCT/JP2019/000906 and English translation thereof.

*Primary Examiner* — Kyung S Lee
(74) *Attorney, Agent, or Firm* — Locke Lord LLP

(57) ABSTRACT

In a thermistor element, a thermistor body formed of a thermistor material, a conductive interlayer formed on the thermistor body, and an electrode layer formed on the conductive interlayer are provided, the conductive interlayer is formed along protrusions and recesses on a surface of the thermistor body, the conductive interlayer is a layer in which $RuO_2$ grains in contact with each other are uniformly distributed and $SiO_2$ interposes in gaps between the $RuO_2$ grains, and the conductive interlayer is formed in a state of adhering to the thermistor body along the protrusions and the recesses on the surface of the thermistor body.

3 Claims, 8 Drawing Sheets

(56) References Cited

U.S. PATENT DOCUMENTS

2009/0206980 A1* 8/2009 Yamashita ............. H01C 7/027
                                                    338/22 R
2013/0020670 A1* 1/2013 Hori ....................... H01C 7/021
                                                    257/467
2020/0343026 A1* 10/2020 Yonezawa ............ H01C 17/281

FOREIGN PATENT DOCUMENTS

| JP | 2004-088019 A | 3/2004 |
| JP | 3661160 B2 | 6/2005 |
| JP | 2007-141881 A | 6/2007 |

* cited by examiner

THERMISTOR ELEMENT AND METHOD FOR MANUFACTURING SAME

TECHNICAL FIELD

The present invention relates to a highly reliable thermistor element including a conductive interlayer having high adhesiveness and a method for manufacturing the same.

Priority is claimed on Japanese Patent Application No. 2018-004419, filed Jan. 15, 2018, the content of which is incorporated herein by reference.

BACKGROUND ART

Generally, as temperature sensors in automobile-related techniques, information equipment, communication equipment, medical equipment, housing equipment, and the like, thermistor temperature sensors are employed. Thermistor elements used in these thermistor temperature sensors are also used in severe environments in which, particularly, the temperature significantly changes repeatedly in many cases.

In addition, regarding the above-described thermistor elements, in the related art, thermistor bodies on which an electrode is formed using a noble metal paste such as Au are employed.

For example, Patent Document 1 describes a thermistor in which an electrode has a bilayer structure of an element electrode on a thermistor body and a cover electrode on the element electrode, the element electrode is a film including glass frit and ruthenium dioxide ($RuO_2$), and the cover electrode is a film formed of a paste including a noble metal and glass frit. In this thermistor, the paste including glass frit and $RuO_2$ is applied onto a surface of the thermistor body and baked, thereby forming the element electrode in a film shape. An electrode area is ensured by this element electrode to maintain an electrical characteristic of the thermistor, and the electric connection between a wire and the element electrode by soldering is ensured by the cover electrode of the noble metal paste.

CITATION LIST

Patent Document

[Patent Document 1]
Japanese Patent No. 3661160

SUMMARY OF INVENTION

Technical Problem

In the above-described related art, the following problems remain.

That is, in the thermistor of the related art, the paste including glass frit and $RuO_2$ grains is applied to the surface of the thermistor body, and this is baked, thereby forming an interlayer of the electrode. At this time, a network of $RuO_2$ is formed in a state in which glass frit particles intervene between the $RuO_2$ grains and thus the contact between the $RuO_2$ grains decreases or the glass frit interposes between the $RuO_2$ grains and thus a number of portions in which electrical conduction between the $RuO_2$ grains is impaired are generated. In the thermistor of the related art, due to an influence of the above-described problems, there is a disadvantage of the resistance value of the interlayer increasing. A role of the interlayer including $RuO_2$ is to prevent an increase in the resistance value of the element by maintaining the electric connection between the thermistor element and an electric circuit even in a case where a part of the electrode peels off from the interlayer. However, in an interlayer having a high resistance value as in the thermistor of the above-described related art, there is a problem in that electric connection is not sufficient and, when the peeling of the electrode progresses due to a heat cycle attributed to a long-term use, the resistance value significantly increases. Furthermore, in the thermistor of the above-described related art, glass layers or air gaps are present in a scattered manner in the interlayer and between the interlayer and the thermistor body, and a strain or a thermal stress is generated due to the unevenness of the glass layers or the air gaps. As a result, there is a problem in that the strength or sufficient adhesiveness with the body of the interlayer cannot be obtained, it is likely that breakage occurs in the interlayer or peeling occurs between the interlayer and the thermistor body, and the interlayer is not capable of sufficiently playing a role of an auxiliary electrode. Furthermore, there is another problem in that the paste including the $RuO_2$ grains and having a high viscosity is applied to the surface of the thermistor body, and thus only the interlayer can be formed in a thick film, and the amount of the $RuO_2$ grains including a rare metal of Ru used increases.

The present invention has been made in consideration of the above-described problems, and an object of the present invention is to provide a thermistor element capable of decreasing the resistance of a conductive interlayer including $RuO_2$ and capable of suppressing an increase in the resistance value attributed to peeling of an electrode due to high adhesiveness and a method for manufacturing the same.

Solution to Problem

The present invention employs the following configurations in order to solve the above-described problems. That is, a thermistor element of a first aspect includes a thermistor body formed of a thermistor material, a conductive interlayer formed on the thermistor body, and an electrode layer formed on the conductive interlayer. The conductive interlayer is formed along protrusions and recesses on a surface of the thermistor body, the conductive interlayer is a layer in which $RuO_2$ grains in contact with each other are uniformly distributed and $SiO_2$ interposes in gaps between the $RuO_2$ grains, and the conductive interlayer is formed in a state of being adhered to the thermistor body along the protrusions and the recesses on the surface of the thermistor body.

In this thermistor element, the conductive interlayer is formed along the protrusions and the recesses on the surface of the thermistor body, the conductive interlayer is a layer in which $RuO_2$ grains in contact with each other are uniformly distributed and $SiO_2$ interposes in the gaps between the $RuO_2$ grains, and the conductive interlayer is formed in a state of adhering to the thermistor body along the protrusions and the recesses on the surface of the thermistor body. As described above, due to the $RuO_2$ grains in the conductive interlayer that are uniformly distributed in the surface of the thermistor body, the in-plane distribution of adhesiveness between the conductive interlayer and the thermistor body is uniform along the surface of the thermistor body, high adhesiveness can be obtained, and a stable electric characteristic can be obtained.

A thermistor element according to a second aspect is the thermistor element according to the first aspect, in which the thickness of the conductive interlayer is 100 to 1,000 nm.

That is, in this thermistor element, the thickness of the conductive interlayer is 100 to 1,000 nm, and thus a conductive interlayer that is a thin film and has a sufficient resistance value can be obtained. When the thickness of the conductive interlayer is less than 100 nm, there is a case where the resistance value becomes insufficient. In addition, as long as the thickness of the conductive interlayer is 1,000 nm or less, a sufficiently low resistance and sufficient adhesiveness can be obtained, and, in order to obtain a thickness exceeding 1,000 nm, more $RuO_2$ grains than necessary are used, which leads to a cost increase.

A method for manufacturing the thermistor element according to a third aspect is a method for manufacturing the thermistor element of the first or second aspect, the method includes an interlayer-forming step of forming a conductive interlayer on the thermistor body formed of the thermistor material and an electrode-forming step of forming an electrode layer on the conductive interlayer, the interlayer-forming step has a step of applying a $RuO_2$ dispersion liquid containing $RuO_2$ grains and an organic solvent onto the thermistor body and drying the $RuO_2$ dispersion liquid to form a $RuO_2$ layer and a step of applying a silica sol-gel liquid containing $SiO_2$, an organic solvent, water, and an acid onto the $RuO_2$ layer and drying the silica sol-gel liquid in a state in which the silica sol-gel liquid is intruded into the $RuO_2$ layer to form the conductive interlayer, and application of the $RuO_2$ dispersion liquid and application of the silica sol-gel liquid are carried out by, for example, a wet-type application method such as spin coating, dip coating, or a slot die coating.

That is, in this method for manufacturing the thermistor element, the application of the $RuO_2$ dispersion liquid and the application of the silica sol-gel liquid are carried out by a wet-type application method such as spin coating, dip coating, or a slot die coating, and thus it is possible to easily obtain a $RuO_2$ layer and a conductive interlayer in which $RuO_2$ grains are uniformly distributed in a plane on the thermistor body and which have a thin thickness and a low resistance.

In this method for manufacturing the thermistor element, in the interlayer-forming step, the $RuO_2$ dispersion liquid containing $RuO_2$ grains and an organic solvent is applied onto the thermistor body and dried to form a $RuO_2$ layer, and thus, at this point in time, a $RuO_2$ layer in a state in which a number of $RuO_2$ grains are in contact with each other is formed. Furthermore, the silica sol-gel liquid containing $SiO_2$, an organic solvent, water, and an acid is applied onto the $RuO_2$ layer, and the silica sol-gel liquid is dried in a state in which the silica sol-gel liquid is intruded into the gaps between the $RuO_2$ grains while maintaining a state in which the $RuO_2$ grains are in contact with each other, thereby forming the conductive interlayer. That is, the $RuO_2$ layer has an agglomeration structure by the $RuO_2$ grains that are uniformly distributed in the plane on the thermistor body and are in contact with each other and is in a state in which the silica sol-gel liquid intrudes into the gaps between the $RuO_2$ grains in contact with each other and, after the silica sol-gel liquid is dried, $SiO_2$ interposes in the gaps. When dried, the silica sol-gel liquid turns into highly pure $SiO_2$ and cures and acts to secure the strength of the conductive interlayer and strongly adhere the thermistor body and the conductive interlayer. In an interlayer of the related art formed of a $RuO_2$ paste including glass frit, $RuO_2$ grains cannot be in sufficient contact with each other due to hindrance by the glass frit; however, in the present invention, the $RuO_2$ layer in which the $RuO_2$ grains are brought into contact with each other in advance is formed using the $RuO_2$ dispersion liquid not including glass frit, and then $SiO_2$ interposes in the gaps between the $RuO_2$ grains as a binder. According to the above-described manufacturing method of the present invention, it is possible to ensure a large contact area between the $RuO_2$ grains. Furthermore, there is no case where molten glass frit enters the contact surfaces between the $RuO_2$ grains and impairs the contact, thereby increasing the resistance. Therefore, it is possible to decrease the resistance of the conductive interlayer. In addition, the $RuO_2$ dispersion liquid having a lower viscosity than the $RuO_2$ paste including glass frit is applied, and thus it is possible to form a thinner conductive interlayer compared with a case where the conductive interlayer is formed using a $RuO_2$ paste including glass frit. As described above, the $RuO_2$ layer in which a number of $RuO_2$ grains are in contact with each other is directly formed on the thermistor body in advance, and thus a low-resistance conductive interlayer can be obtained. In addition, due to the high adhesiveness between the thermistor body and the conducting interlayer, even when peeling of the electrode progresses in a heat cycle test, the low-resistance conductive interlayer is not peeled off and acts as an auxiliary electrode. Furthermore, it is possible to suppress an increase in the resistance value of the element by making the in-plane distribution of electric resistance in the conductive interlayer uniform.

Advantageous Effects of Invention

According to the present invention, the following effects are exhibited.

That is, in the thermistor element according to the present invention, the conductive interlayer is a layer in which the $RuO_2$ agglomerating grains are uniformly distributed along the protrusions and the recesses on the surface of the thermistor body, the conductive interlayer is the layer in which $SiO_2$ interposes in the gaps between the $RuO_2$ grains, and the conductive interlayer is formed in a state of adhering to the thermistor body along the protrusions and the recesses on the surface of the thermistor body. In the present configuration, due to the $RuO_2$ grains in the conductive interlayer that are uniformly distributed in the surface of the thermistor body, the in-plane distribution of adhesiveness between the conductive interlayer and the thermistor body is uniform along the surface of the thermistor body, high adhesiveness can be obtained, and a stable electric characteristic can be obtained.

Therefore, in the present invention, a low resistance can be obtained in spite of a thin conductive interlayer, and, even when peeling of the electrode progresses in a heat cycle test or the like, it is possible to suppress an increase in the resistance value due to the high adhesiveness between the thermistor body and the conductive interlayer.

In addition, according to the method for manufacturing the thermistor element according to the present invention, the application of the $RuO_2$ dispersion liquid and the application of the silica sol-gel liquid are carried out by a wet-type application method such as spin coating, dip coating, or a slot die coating, and thus it is possible to easily obtain a $RuO_2$ layer and a conductive interlayer in which $RuO_2$ grains are uniformly distributed in a plane on the thermistor body and which have a thin thickness and a low resistance.

DESCRIPTION OF EMBODIMENTS

Figure 1:
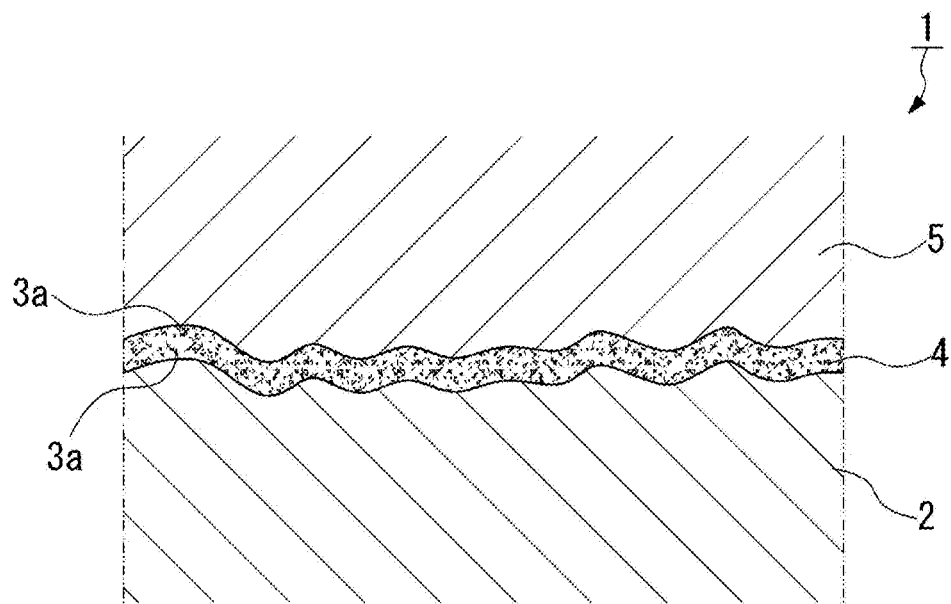
FIG. 1 is an enlarged cross-sectional view of a main part of a thermistor element in an embodiment of a thermistor element and a manufacturing method therefor according to the present invention.

Hereinafter, an embodiment of a thermistor element and a manufacturing method therefor according to the present invention will be described with reference to FIG. 1 to FIG. 5A and FIG. 5B. In the respective drawings used in the following description, scales are appropriately changed as necessary in order for individual members to be made recognizable or easily recognized.

As shown in FIG. 1 to FIGS. 3A to 3C, a thermistor element 1 of the present embodiment includes a thermistor body 2 formed of a thermistor material, a conductive interlayer 4 formed on the thermistor body 2, and an electrode layer 5 formed on the conductive interlayer 4.

The conductive interlayer 4 is a layer in which $RuO_2$ grains 3a agglomerating along protrusions and recesses (roughness) on a surface of the thermistor body 2 are uniformly distributed and $SiO_2$ interposes in gaps between the $RuO_2$ grains 3a and is formed in a state of adhering to the thermistor body 2 along the protrusions and the recesses on the surface of the thermistor body 2.

As described above, the conductive interlayer 4 has a lamellar agglomeration structure by $RuO_2$ grains 3a electrically in contact with each other and has a thickness of 100 to 1,000 nm. That is, the conductive interlayer 4 is formed of $RuO_2$ grains that are in contact with each other and thus electrically conductive with each other, and $SiO_2$ interposes in gaps generated between the agglomerating $RuO_2$ grains 3a.

Figure 4A:
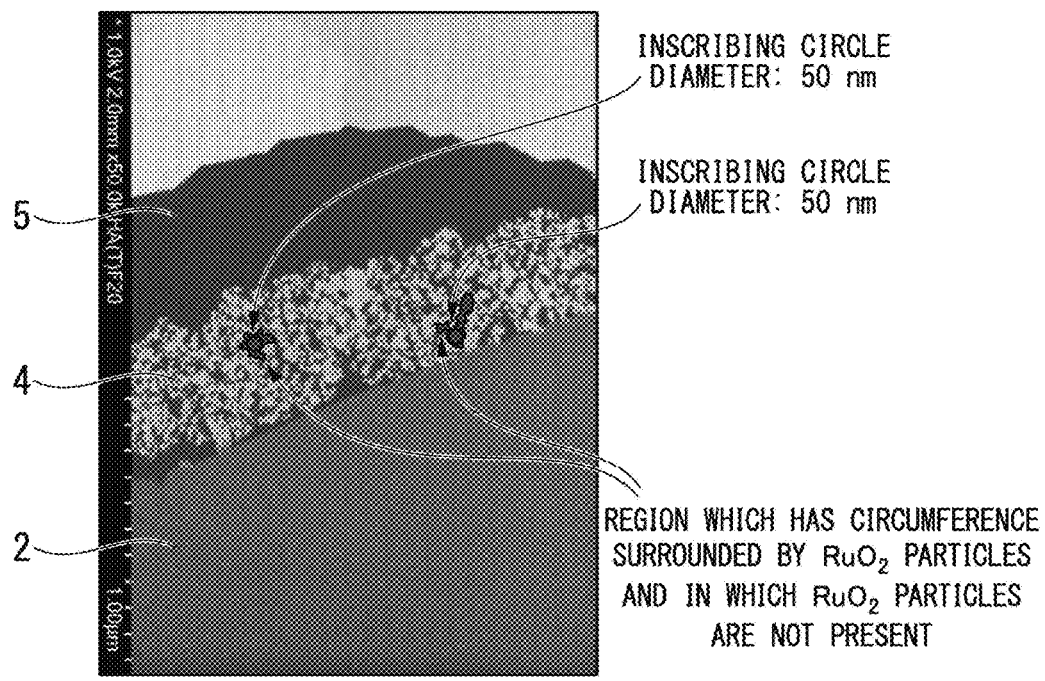
FIG. 4A is an explanatory view in which a SEM image of a thermistor element of Example 7 of the present invention is used in order to describe definition of "being uniformly distributed".

The expression "uniformly distributed" in the present invention means a case where a cross section observation by a scanning electron microscope shows that, as shown in FIG. 4A, in the conductive interlayer 4, a region which has a circumference surrounded by the $RuO_2$ grains 3a and in which the $RuO_2$ grain 3a inscribing a space formed by a circle having a diameter of 300 nm or more is not present is not included in 5 μm of the conductive interlayer 4 in a direction along the surface of the thermistor body 2.

In addition, in the above-described cross section observation, a cross section is processed by ion polishing, and a determination is made using a backscattered electron image at an accelerated voltage of 1 kV.

Figure 4B:
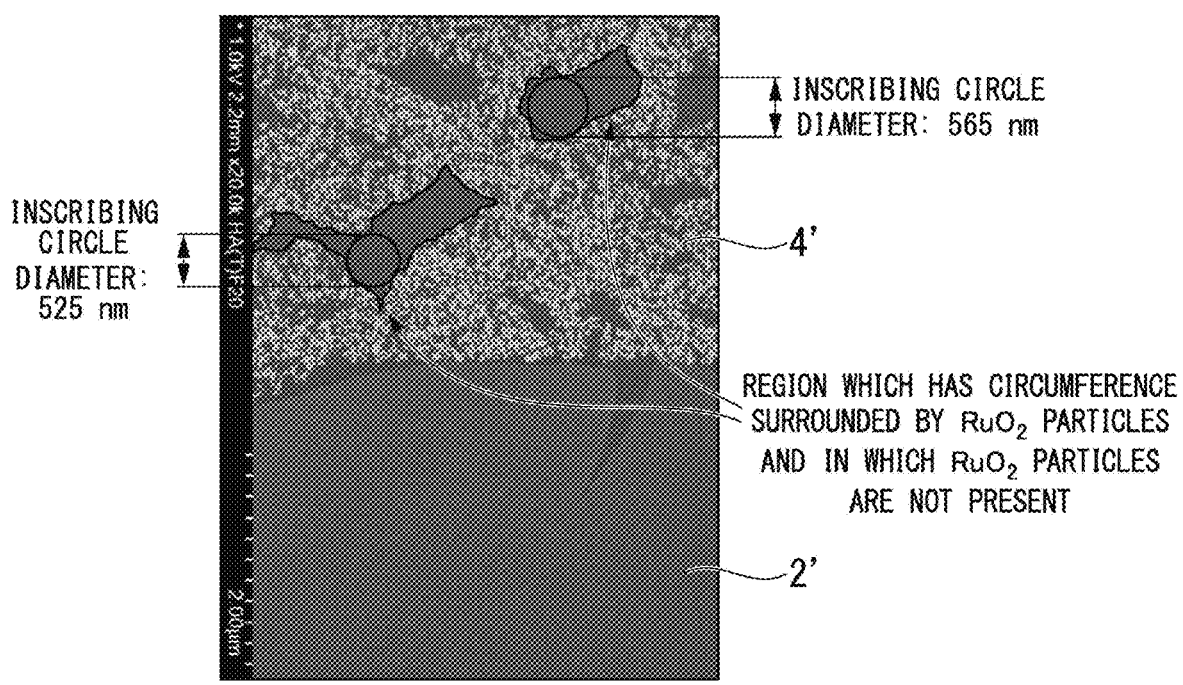
FIG. 4B is an explanatory view in which a SEM image of a thermistor element of Comparative Example 5 of the present invention is used in order to describe the definition of "being uniformly distributed".

FIG. 4A is a backscattered electron image in Example 7 of the present invention described below, and FIG. 4B is a backscattered electron image in Comparative Example 5 of the present invention described below. As shown in FIG. 4A, in Example 7 of the present invention, a region in which the $RuO_2$ grains 3a are not present is not included in 5 μm of the conductive interlayer 4 in the direction along the surface of the thermistor body 2, and thus the $RuO_2$ grains 3a "are uniformly distributed". On the other hand, in Comparative Example 5, as shown in FIG. 4B, a region in which the $RuO_2$ grains 3a are not present is included in 5 μm of the conductive interlayer 4 in the direction along the surface of the thermistor body 2, and thus it cannot be said that the $RuO_2$ grains 3a "are uniformly distributed".

Figure 5A:
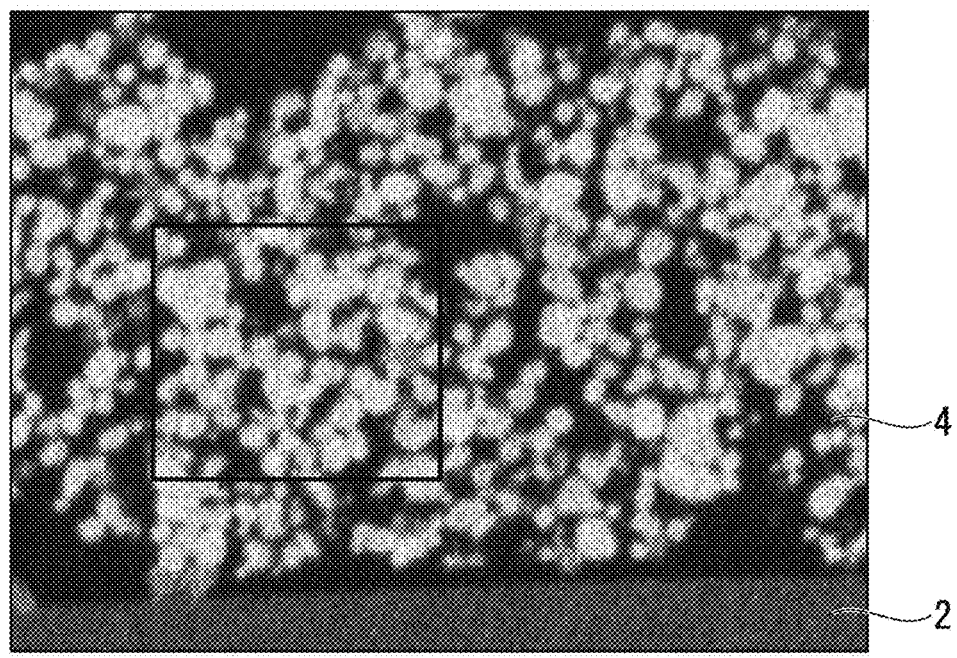
FIG. 5A is an enlarged cross-sectional view showing a conductive interlayer in the thermistor element of Example 7 of the present invention in order to describe a state of being "in contact with each other".
Figure 5B:
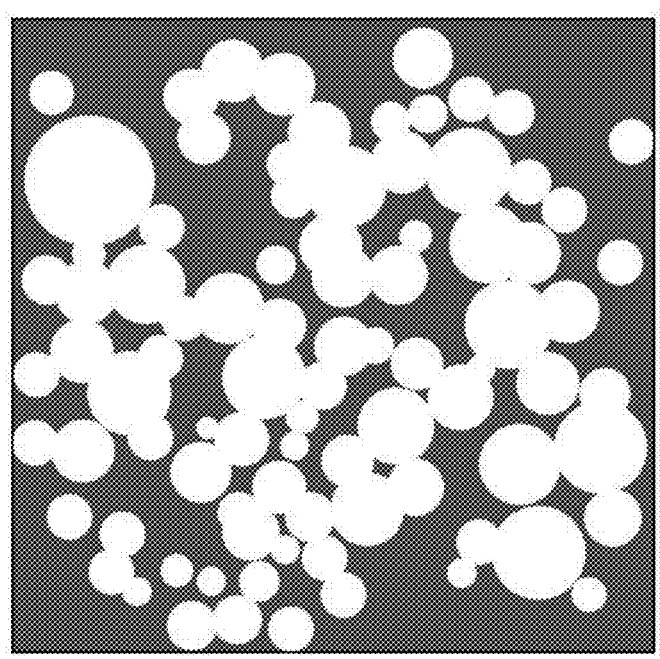
FIG. 5B is a view schematically showing a coupling state of particles in a region surrounded by a square line in the enlarged cross-sectional view shown in FIG. 5A as spherical particles in order to describe the state of being "in contact with each other".

In addition, the expression "in contact with each other" in the present invention indicates a state in which spherical particles of the $RuO_2$ grains 3a are in contact with each other or neck down and indicates that an electron is capable of migrating between the $RuO_2$ grains and the conductive property is favorable. Conversely, the fact that the interlayer by the $RuO_2$ grains 3a has a favorable conductive property indicates that the $RuO_2$ grains 3a are in contact with each other. FIG. 5A shows an enlarged cross-sectional view (SEM image) of the conductive interlayer 4 in Example 7 of the present invention in order to show a state of the $RuO_2$ grains 3a "being in contact with each other". In addition, a coupling state of particles in a region surrounded by a square line in this enlarged cross-sectional view is schematically shown using spherical particles in FIG. 5B. In FIG. 5B, $SiO_2$ interposes in gap portions, which are shown grey, between the $RuO_2$ grains 3a.

In this thermistor element 1, change rates of the resistance value at 25° C. before and after a heat cycle test in which one cycle includes −55° C. for 30 min and 200° C. for 30 min and this cycle is repeated 50 times are less than 2.5%.

Figure 3A:
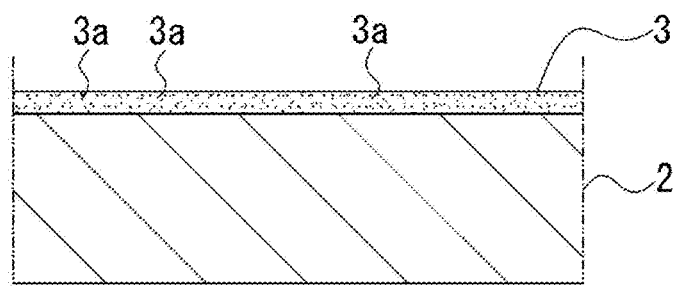
FIG. 3A is a cross-sectional view showing a step of forming a $RuO_2$ layer of the method for manufacturing the thermistor element of the present embodiment.
Figure 3B:
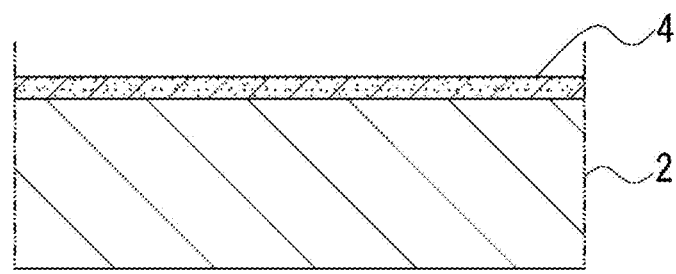
FIG. 3B is a cross-sectional view showing a step of forming a conductive interlayer of the method for manufacturing the thermistor element of the present embodiment.
Figure 3C:
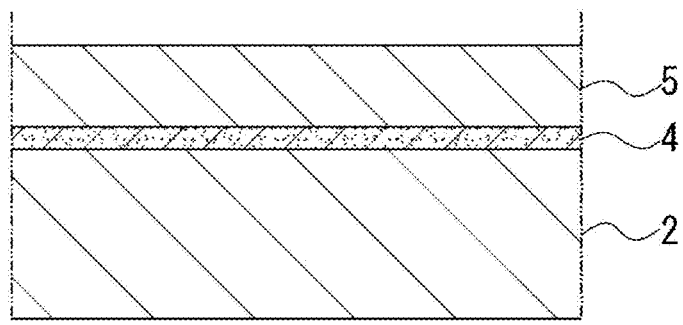
FIG. 3C is a cross-sectional view showing a step of forming an electrode layer of the method for manufacturing the thermistor element of the present embodiment.

As shown in FIG. 3A to FIG. 3C, a method for manufacturing the thermistor element 1 of the present embodiment has an interlayer-forming step of forming the conductive interlayer 4 on the thermistor body 2 formed of the thermistor material and an electrode-forming step of forming the electrode layer 5 on the conductive interlayer 4.

The interlayer-forming step has a step of applying a $RuO_2$ dispersion liquid containing the $RuO_2$ grains 3a and an organic solvent onto the thermistor body 2 and drying the $RuO_2$ dispersion liquid to form a $RuO_2$ layer 3 as shown in FIG. 3A and a step of applying a silica sol-gel liquid containing an oligomer body of silicon alkoxide, an organic solvent, water, and an acid onto the $RuO_2$ layer 3 and drying the silica sol-gel liquid in a state in which the silica so-gel liquid is intruded into the $RuO_2$ layer 3 to form the conductive interlayer 4 as shown in FIG. 3B.

In addition, the application of the $RuO_2$ dispersion liquid and the application of the silica sol-gel liquid are carried out by a wet-type application method such as spin coating, dip coating, or a slot die coating.

The electrode-forming step has a step of applying a noble metal paste including a noble metal to the conductive interlayer 4 and a step of heating and baking the applied noble metal paste to form the electrode layer 5 of the noble metal as shown in FIG. 3C.

The thickness of the $RuO_2$ layer 3 is set to 100 to 1,000 nm.

As the thermistor body 2, for example, Mn—Co—Fe, Mn—Co—Fe—Al, Mn—Co—Fe—Cu, and the like can be employed. The thickness of this thermistor body 2 is, for example, 200 μm.

The $RuO_2$ dispersion liquid is, for example, a $RuO_2$ ink obtained by mixing the $RuO_2$ grains 3a and an organic solvent.

As the $RuO_2$ grains 3a, $RuO_2$ grains having an average grain diameter of 10 nm to 100 nm are preferably used, and $RuO_2$ grains having an average grain diameter of approximately 50 nm are particularly preferred.

As the organic solvent, one kind of well-known solvent such as ethanol or a mixture of a plurality of well-known solvents can be used, and a dispersant soluble in the organic solvent may be included. As the dispersant, a polymer-type dispersant having a plurality of adsorptive groups is preferred.

In the $RuO_2$ dispersion liquid, the content proportion of the $RuO_2$ grains 3a is not particularly limited; however, in a case where the content proportion is 5% by mass to 30% by mass, the region in which the $RuO_2$ grains 3a are not present is not easily formed, and the viscosity is lower than that of a paste of the related art including glass frit and $RuO_2$, and thus a thin $RuO_2$ layer 3 can be formed.

The silica sol-gel liquid is, for example, a liquid mixture of an oligomer body of silicon alkoxide, ethanol, water, and nitric acid. As the organic solvent used in the silica sol-gel liquid, an organic solvent other than the ethanol may also be employed. In addition, the acid used in the silica sol-gel liquid functions as a catalyst accelerating a hydrolysis reaction, and an acid other than nitric acid may also be employed.

The noble metal paste is, for example, an Au paste containing glass frit.

In the interlayer-forming step, the $RuO_2$ dispersion liquid containing the $RUO_2$ grains 3a and the organic solvent is applied onto the thermistor body 2 and dried to form the $RuO_2$ layer 3, and thus, at this point in time, a thin $RuO_2$ layer 3 in a state in which a number of $RuO_2$ grains 3a are in contact with each other is formed.

Specifically, when the $RuO_2$ dispersion liquid containing the $RuO_2$ grains 3a is applied onto the thermistor body 2 by a wet-type application method such as spin coating, dip coating, or a slot die coating and dried at 150° C. for 10 min, the organic solvent in the $RuO_2$ dispersion liquid is evaporated, and a $RuO_2$ layer 3 in a state in which the $RuO_2$ grains 3a are in contact with each other is formed. At this time, in portions other than the contact portion between the $RuO_2$ grains 3a, fine gaps are generated.

Next, the silica sol-gel liquid containing $SiO_2$, an organic solvent, water, and an acid is applied onto the $RuO_2$ layer 3, and the silica sol-gel liquid is dried in a state in which the silica sol-gel liquid is intruded into the $RuO_2$ layer 3, thereby forming the conductive interlayer 4, whereby the $RuO_2$ layer has an agglomeration layer by the $RuO_2$ grains 3a in contact with each other and is in a state in which the silica sol-gel liquid intrudes into the gaps between the $RuO_2$ grains 3a in contact with each other and $SiO_2$ interposes in the gaps after the silica sol-gel liquid is dried. When dried, the silica sol-gel liquid turns into highly pure $SiO_2$ and cures and acts to secure the strength of the conductive interlayer 4 and strongly adhere the thermistor body 2 and the conductive interlayer 4.

Specifically, when the silica sol-gel liquid is applied onto the $RuO_2$ layer 3 by spin coating, the silica sol-gel liquid in the $RuO_2$ layer 3 intrudes into the fine gaps between the $RuO_2$ grains 3a, and then, when the silica sol-gel liquid is dried, for example, at 150° C. for 10 min, ethanol, water, and nitric acid are evaporated, the polymerization of the oligomer body of silicon alkoxide progresses, and only $SiO_2$ remains in the gaps. At this time, $SiO_2$ functions as a binder of the $RuO_2$ grains 3a. As described above, the conductive interlayer 4 in which $SiO_2$ interposes in the fine gaps between the $RuO_2$ grains 3a in contact with each other is formed.

The thickness of the conductive interlayer 4 is 100 nm to 1,000 nm and more preferably 150 nm to 500 nm.

After that, the noble metal paste is applied onto the conductive interlayer 4 and baked, for example, at 850° C. for 10 min, whereby the adhesiveness between the $RuO_2$ grains 3a in contact with each other is enhanced by heating. In addition, into the gaps between the $RuO_2$ grains 3a that are not fully filled with the silica sol-gel liquid, the glass frit dissolves and intrudes.

Figure 2:
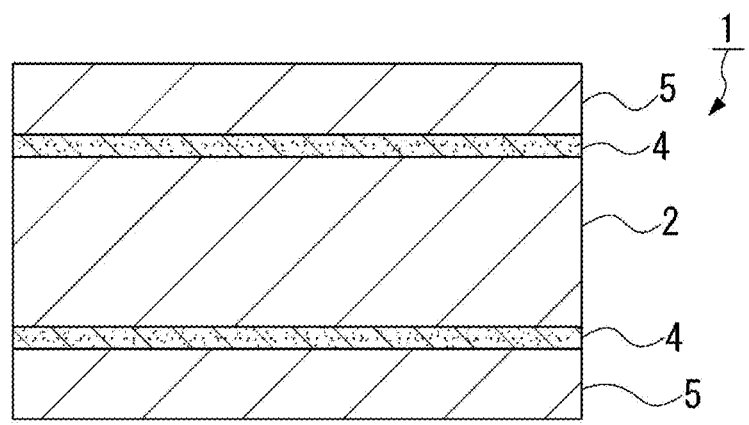
FIG. 2 is a cross-sectional view showing the thermistor element in the present embodiment.

In the above-described manner, the thermistor element 1 having the electrode layer 5 of Au formed on the conductive interlayer 4 as shown in FIG. 1 and FIG. 2 is produced.

In the thermistor element 1 of the present embodiment, the conductive interlayer 4 is a layer in which the agglomerating $RuO_2$ grains are uniformly distributed along the protrusions and the recesses on the surface of the thermistor body 2, and the conductive interlayer 4 is the layer in which $SiO_2$ interposes in the gaps between the $RuO_2$ grains 3a, and the conductive interlayer 4 is formed in a state of adhering to the thermistor body 2 along the protrusions and the recesses on the surface of the thermistor body 2. As described above, due to the $RuO_2$ grains 3a in the conductive interlayer that are uniformly distributed in the surface of the thermistor body, the in-plane distribution of adhesiveness between the conductive interlayer and the thermistor body is uniform along the surface of the thermistor body 2, high adhesiveness can be obtained, and a stable electric characteristic can be obtained.

In addition, the thickness of the conductive interlayer 4 is 100 to 1,000 nm, and thus a conductive interlayer 4 that is a thin film and has a sufficient resistance value can be obtained.

Therefore, a low resistance can be obtained in spite of the thin conductive interlayer 4, and, even when peeling between the conductive interlayer 4 and the electrode layer 5 progresses in a heat cycle test or the like, it is possible to suppress an increase in the resistance value due to the high adhesiveness between the thermistor body 2 and the conductive interlayer 4.

In the method for manufacturing the thermistor element 1 of the present embodiment, the $RuO_2$ layer 3 in which the $RuO_2$ grains 3a are brought into contact with each other in advance is formed using the $RuO_2$ dispersion liquid not including glass frit, and then $SiO_2$ interposes in the gaps between the $RuO_2$ grains 3a as a binder. According to this manufacturing method, a large contact area between the $RuO_2$ grains 3a is ensured, and there is no case where molten glass flit enters the contact surfaces between the $RuO_2$ grains 3a and impairs the contact, thereby increasing the resistance, and thus it is possible to decrease the resistance of the conductive interlayer 4. In an interlayer of the related art formed of a $RuO_2$ paste including glass frit, the $RuO_2$ grains 3a cannot be in sufficient contact with each other due to hindrance by the glass frit.

In addition, in the method for manufacturing the thermistor element 1 of the present embodiment, the $RuO_2$ dispersion liquid having a lower viscosity than the paste is applied, and thus it is possible to form a thinner conductive interlayer 4 compared with a case where the conductive interlayer is formed using the paste.

Here, the lower viscosity than that of the paste indicates, for example, approximately 0.001 Pa·s to 0.1 Pa·s compared with an ordinary viscosity of the paste of several ten to several hundred Pa·s.

Furthermore, the $RuO_2$ layer 3 to which a number of $RuO_2$ grains 3a adhere is directly formed on the thermistor body 2 in advance, and thus a low-resistance conductive interlayer 4 can be obtained, and, even when peeling of the electrode progresses in a heat cycle test or the like, it is possible to suppress an increase in the resistance value due to the high adhesiveness between the thermistor body 2 and the conductive interlayer 4.

Particularly, in the method for manufacturing the thermistor element 1 of the present embodiment, the application of the $RuO_2$ dispersion liquid and the application of the silica sol-gel liquid are carried out by a wet-type application method such as spin coating, dip coating, or a slot die coating, and thus it is possible to easily obtain a $RuO_2$ layer 3 and a conductive interlayer 4 in which the $RuO_2$ grains 3a are uniformly distributed in a plane on the thermistor body 2 and which have a thin thickness and a low resistance.

In addition, the electrode-forming step has a step of applying the noble metal paste including the noble metal to the conductive interlayer 4 and a step of heating and baking the applied noble metal paste to form the electrode layer 5 of the noble metal, and thus the adhesion between the $RuO_2$ grains 3a becomes stronger when the noble metal paste is baked. In addition, the glass frit included in the noble metal paste dissolves and intrudes into the gaps between the $RuO_2$ grains 3a that are not fully filled with the silica sol-gel liquid, thereby more strongly fixing the $RuO_2$ grains 3a to each other as a binder, and it is possible to obtain a stable conductive interlayer 4.

Examples

Figure 7:
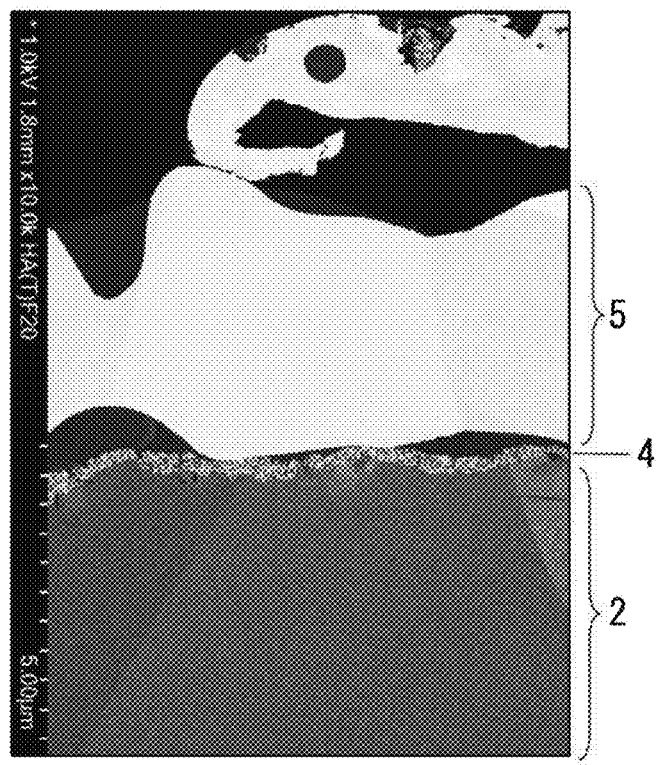
FIG. 7 is a SEM photograph showing a cross section of a thermistor element in an example (Example 4) according to the present invention of the thermistor element and the manufacturing method therefor.
Figure 8:
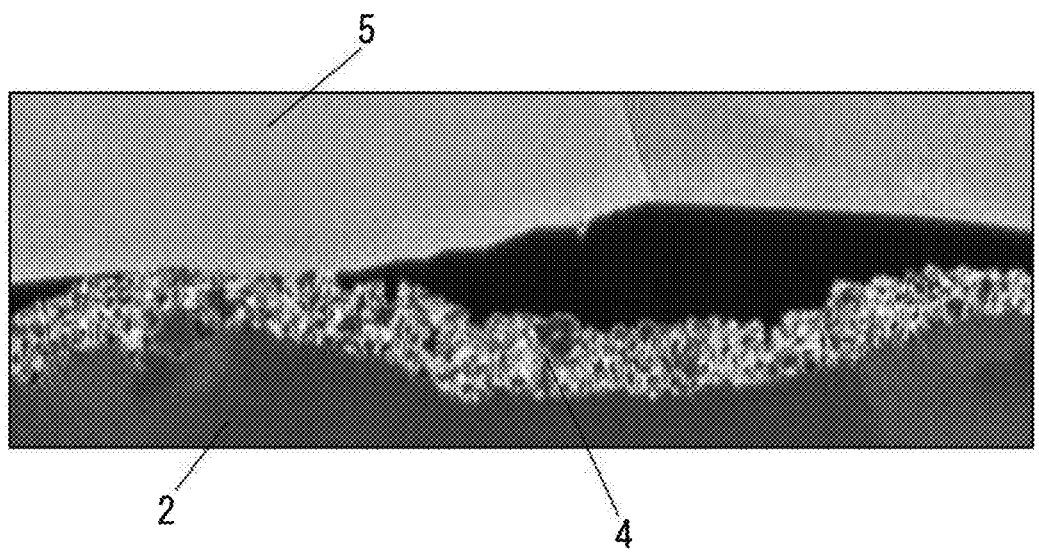
FIG. 8 is a main part enlarged view of the SEM photograph showing the cross section of the thermistor element in the example (Example 4) according to the present invention.
Figure 9:
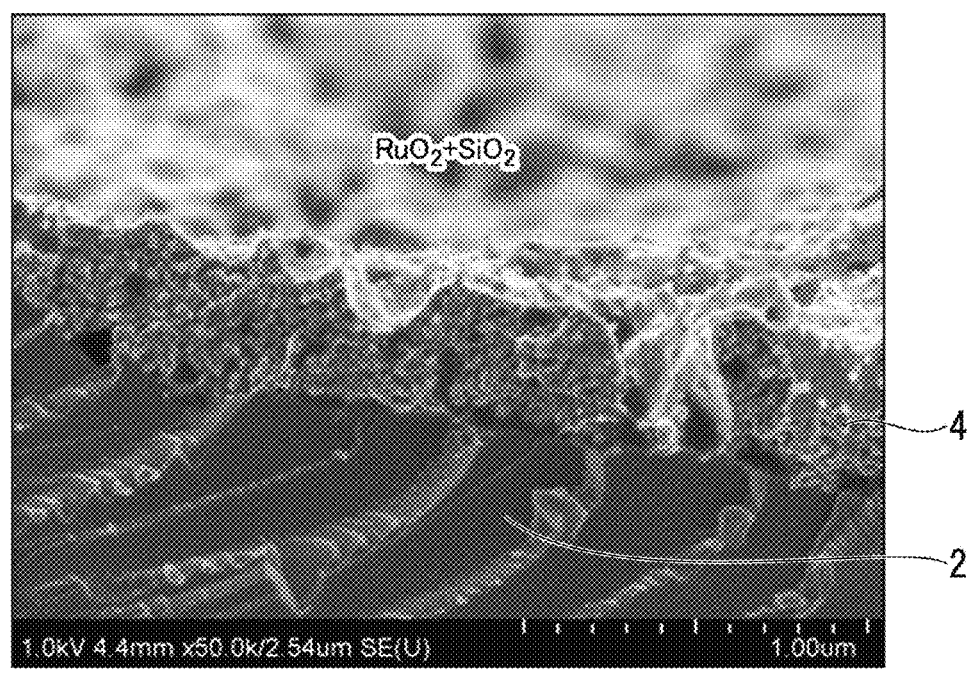
FIG. 9 is a SEM photograph showing a cross-sectional state before formation of an electrode layer in the example (Example 4) according to the present invention.
Figure 10:
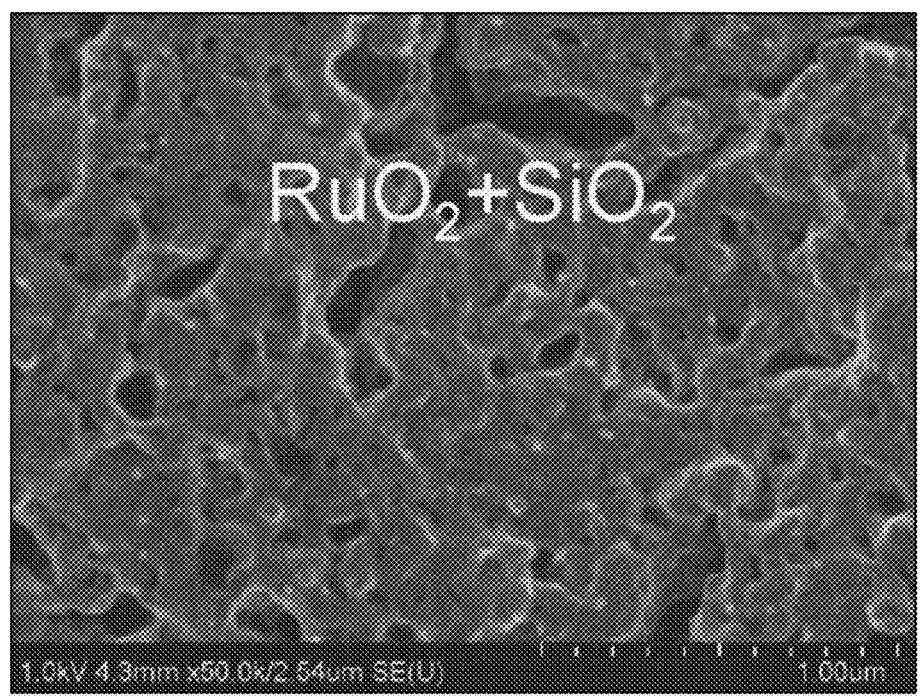
FIG. 10 is a SEM photograph of a conductive interlayer showing a surface state before the formation of the electrode layer in the example (Example 4) according to the present invention.

Regarding the thermistor element 1 produced on the basis of the embodiment, SEM photographs of cross sections are shown in FIG. 7 and FIG. 8, and SEM photographs showing a cross-sectional state before the formation of an electrode layer and a surface state of a conductive interlayer are shown in FIG. 9 and FIG. 10 (Example 4).

Figure 6:
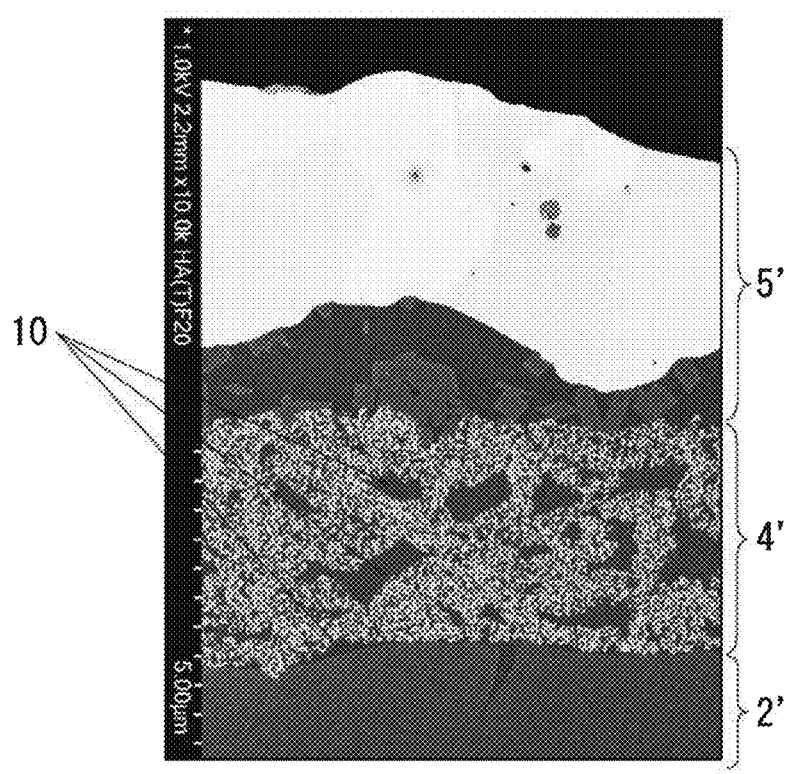
FIG. 6 is a SEM photograph showing a cross section of a thermistor element in a related art example (Comparative Example 4) of the thermistor element and the manufacturing method therefor.

For comparison, for a thermistor element of the related art in which a conductive interlayer is formed using a paste including glass frit and $RuO_2$ as well, a SEM photograph of a cross section is shown in FIG. 6 (Comparative Example 4).

Specifically, a thermistor element 1 shown in FIG. 7 to FIG. 10 is made up of a thermistor body 2 formed of Mn—Co—Fe—Al—O, a conductive interlayer 4 in which $SiO_2$ interposes in gaps in a $RuO_2$ layer 3 formed of $RuO_2$ grains 3a, and an electrode layer 5 formed using Au.

The thermistor element of the related art shown in FIG. 6 is made up of a thermistor body 2' formed of Mn—Co—Fe—Al—O, a conductive interlayer 4' formed using a paste including glass frit and $RuO_2$, and an electrode layer 5' formed using Au.

As is clear from these photographs, in FIG. 6 showing a related art example (Comparative Example 4), a number of lumps of a glass layer 10 are dispersed in the conductive interlayer 4', regions in which the $RuO_2$ grain is not present are present in a scattered manner, and the $RuO_2$ grains are unevenly distributed. On the other hand, in the conductive interlayer 4 of the present invention shown in FIG. 7, $RuO_2$ grains agglomerating along protrusions and recesses on a surface of the thermistor body 2 are uniformly distributed and configure a thin film (Example 4).

In FIG. 6 showing the related art example (Comparative Example 4), the glass layer 10 is present in a scattered manner between the thermistor body 2' and the conductive interlayer 4', and portions in which the conductive interlayer 4' does not adhere to the thermistor body 2' are present in a scattered manner. On the other hand, the conductive interlayer 4 of the present invention shown in FIG. 7 is in a state in which no glass layer is shown between the thermistor body 2 and the conductive interlayer 4 and the $RuO_2$ grains are continuously in contact with each other and adhere to each other, and the conductive interlayer 4 is formed in a thin film shape in a state of adhering to the thermistor body 2 along the protrusions and the recesses on the surface of the thermistor body 2 (Example 4).

Next, examples of the thermistor element 1 produced for a heat cycle test were flake thermistors having a flake shape with dimensions set to 1.0×1.0×0.2 nm, that is, flake thermistors having an overall size of 1.0×1.0 mm in a planar view with a thickness of 0.2 mm.

Thermistor elements 1 used in Examples 1 to 6 are made up of a thermistor body 2 formed of Mn—Co—Fe—Al—O, a conductive interlayer 4 in which $SiO_2$ interposes in gaps in a $RuO_2$ layer 3 formed of $RuO_2$ grains 3a, and an electrode layer 5 formed using an Au paste. Thicknesses of the conductive interlayers 4 changed in Examples 1 to 6 are shown in Table 1. Baking times shown in Table 1 indicate baking times during which the temperature reaches a peak temperature at the time of baking the Au electrode and then the temperature is retained.

This thermistor element 1 was mounted on a gold-metallized AlN substrate using a foil-like Au—Sn solder under a condition of 325° C. in an $N_2$ flow. The AlN substrate on which the thermistor element was mounted was fixed onto a wired printed substrate using an adhesive, and an evaluation circuit was formed by Au wire bonding and used as a sample for evaluation.

Figure 11:
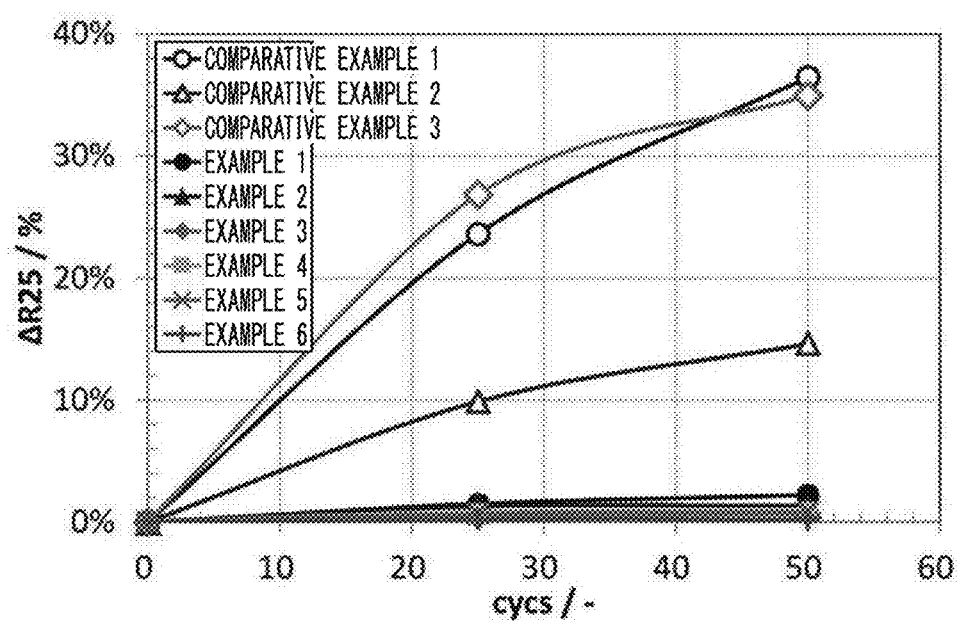
FIG. 11 is a graph showing changes in resistance value ($\Delta R25$) with respect to the number of heat cycles, which shows heat cycle test results in examples (Examples 1 to 6) and comparative examples (Comparative Examples 1 to 3) according to the present invention.

One cycle of a heat cycle test includes −55° C. for 30 min and 200° C. for 30 min, and the results of change rates of the resistance value at 25° C. measured before and after the heat cycle tests in which the cycle was repeated 25 times and 50 times respectively are shown in Table 1 and FIG. 11. In this heat cycle test, normal temperature (25° C.) for three minutes is provided between −55° C. for 30 min and 200° C. for 30 min.

In Table 1, the resistance values at 25° C. are shown in the "R25 [Ω]" column, and the change rates of the resistance value after the respective cycles from the initial resistance value at 25° C. are shown in the "ΔR25" column.

The initial resistance value, the resistance value after 25 cycles, and the resistance value after 50 cycles were measured as described below: the sample for evaluation was connected to a cable for measurement, the sample portion was put into a waterproof pouch, the waterproof pouch was immersed in a constant-temperature vessel adjusted to 25.000±0.005° C. for 15 minutes to stabilize the temperature, and the value was measured using a 3706 system switch multimeter manufactured by Keithley Instruments to which a cable for measurement was connected.

As the comparative examples, thermistor elements obtained by directly applying the Au paste used in Examples 1 to 6 onto the thermistor bodies used in Examples 1 to 6 without employing the conductive interlayer of the present invention and carrying out a baking treatment thereon were tested in the same manner, and the results are also shown in Table 1 and FIG. 11. For both the examples and the comparative examples, the results are the average values of 20 elements measured respectively.

As is clear from the results of these heat cycle tests, in all of Comparative Examples 1 to 3, the resistance values significantly increased; however, in all of Examples 1 to 6 of the present invention in which the conductive interlayer obtained by the above-described manufacturing method was employed, the changes in resistivity were slight. This is considered to be because, as the peeling of the electrode further spread due to the heat cycle test, and the peeling rate of the electrode increased, in the comparative examples, the resistance value significantly increased because the thermistor element did not have the interlayer; however, in the examples of the present invention, even when the peeling of the electrode occurred, the conductive interlayer had a low resistance, and the high adhesiveness to the thermistor body was maintained, and thus an increase in the resistance value was suppressed. These test results also coincide with the simulation results of a change in resistivity caused by a change in the peeling rate of the electrode.

TABLE 1

| | Baking time [min] | Interlayer film thickness [nm] | Initial R25 [Ω] | 25 cycs R25 [Ω] | 25 cycs ΔR25 | 50 cycs R25 [Ω] | 50 cycs ΔR25 |
|---|---|---|---|---|---|---|---|
| Comparative Example 1 | 10 | — | 3772 | 4663 | 23.6% | 5147 | 36.4% |
| Comparative Example 2 | 30 | — | 3744 | 4113 | 9.9% | 4291 | 14.6% |
| Comparative Example 3 | 60 | — | 3728 | 4728 | 26.8% | 5030 | 34.9% |
| Example 1 | 10 | 150 | 3699 | 3754 | 1.5% | 3781 | 2.2% |
| Example 2 | 10 | 210 | 3756 | 3804 | 1.3% | 3807 | 1.3% |
| Example 3 | 30 | 210 | 3690 | 3707 | 0.5% | 3713 | 0.6% |
| Example 4 | 60 | 240 | 3672 | 3704 | 0.9% | 3710 | 1.0% |
| Example 5 | 10 | 440 | 3672 | 3697 | 0.7% | 3703 | 0.8% |
| Example 6 | 10 | 850 | 3675 | 3683 | 0.2% | 3683 | 0.2% |

Figure 12:
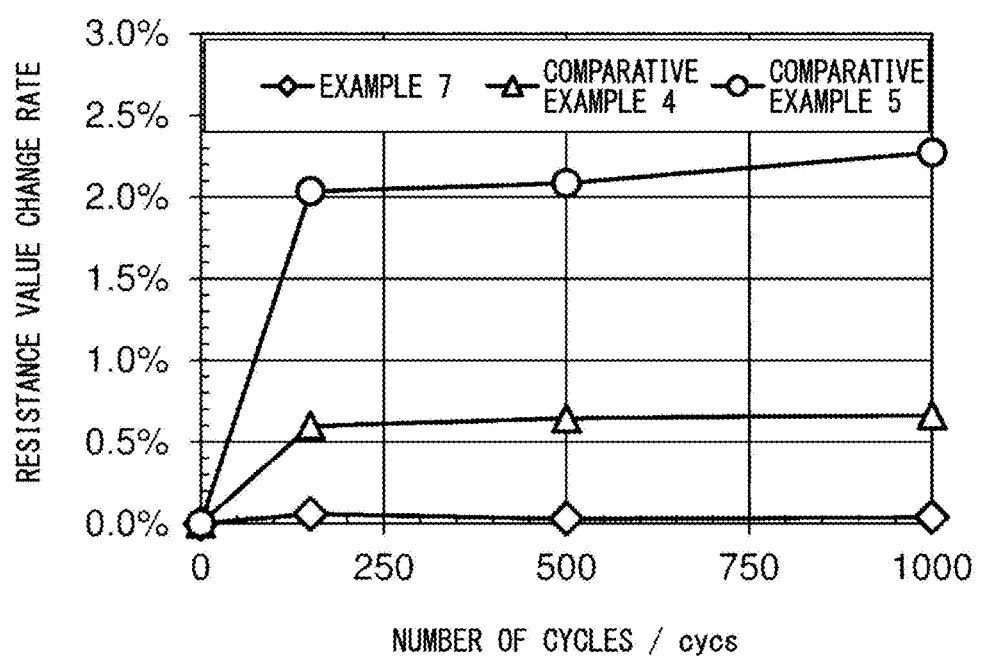
FIG. 12 is a graph showing resistance value change rates with respect to the number of heat cycles, which shows heat cycle test results in an example (Example 7) and comparative examples (Comparative Examples 4 and 5) according to the present invention.

In addition, as Example 7 of the present invention, a thermistor element was produced by forming a conductive interlayer having a film thickness of approximately 200 nm and containing $RuO_2$ grains on a thermistor body formed of Mn—Co—Fe—Al—O by spin coating and then forming an electrode layer by an Au paste on the conductive interlayer. The obtained thermistor element was mounted on an AlN substrate in the same manner as in Examples 1 to 6 to form an evaluation circuit in the same manner as in Examples 1 to 6, and resistance value change rates at the time of carrying out a heat cycle test (repetition of −40° C. and 85° C.) are shown in FIG. 12. As Comparative Example 4, a thermistor element in which, instead of the conductive interlayer of Example 7, a conductive interlayer was formed using a $RuO_2$ paste including glass frit of the related art was produced. As Comparative Example 5, a thermistor element having no conductive interlayer, that is, a thermistor element in which an electrode layer by an Au paste was directly formed on the thermistor body used in Example 7 was produced, the same heat cycle test as in Example 7 was also carried out on this comparative example, and the thermistor element was evaluated. The results are also shown in FIG. 12.

The resistance change rates were measured using the same method as in Examples 1 to 6.

All of the thermistor elements had a size of 0.6×0.6×0.2 mm, 20 thermistor elements were evaluated in each example or comparative example, and, among these, the thermistor elements having a resistance value that changed most are shown.

In this heat cycle test as well, in Example 7 of the present invention, the resistance value rarely changed; however, in Comparative Example 4 in which the conductive interlayer was formed using the $RuO_2$ paste of the related art, the resistance value increased, and, furthermore, in Comparative Example 5 having no conductive interlayer, the resistance value increased more significantly.

Next, die shear tests were carried out on the example (Example 4) of the present invention and the related art example (Comparative Example 4).

The die shear test was carried out by mounting the thermistor elements of the related art example (Comparative Example 4) and the example (Example 4) of the present invention on an Au metallized substrate using an AuSn solder.

The die shear test was carried out using XYZTEC's bond tester Condor under conditions of a gap of 0.05 mm and a shear rate of 1 nm/s.

As a result, in the related art example (Comparative Example 4) in which a thick conducting interlayer was formed by the printing of a paste including glass frit and $RuO_2$, peeling occurred between the thermistor body and the conducting interlayer. On the other hand, in the example (Example 4) of the present invention in which a thin conducting interlayer was formed by the spin coating, it was found that peeling occurred between the electrode layer and the conducting interlayer or between the electrode layer and the AuSn solder and the adhesiveness between the thermistor body and the conducting interlayer was high.

The die shear strength of the related art example was 3.9 kgf/mm² (average value with N=5), and a die shear strength of the example of the present invention was higher than that of the related art example and was 5.8 kgf/mm² (average value with N=5).

The technical scope of the present invention is not limited to the above-described embodiment and the above-described examples, and it is possible to add a variety of modifications within the scope of the gist of the present invention.

REFERENCE SIGNS LIST

1: thermistor element
2: thermistor body
3: $RuO_2$ layer
3a: $RuO_2$ grain
4: conductive interlayer
5: electrode layer

The invention claimed is:

1. A thermistor element comprising:
a thermistor body formed of a thermistor material;
a conductive interlayer formed on the thermistor body; and
an electrode layer formed on the conductive interlayer,
wherein the conductive interlayer is formed along protrusions and recesses on a surface of the thermistor body,
the conductive interlayer is a layer in which $RuO_2$ grains in contact with each other are uniformly distributed and $SiO_2$ interposes in gaps between the $RuO_2$ grains, and
the conductive interlayer is formed in a state of adhering to the thermistor body along the protrusions and the recesses on the surface of the thermistor body.

2. The thermistor element according to claim 1, wherein a thickness of the conductive interlayer is 100 to 1,000 nm.

3. A method for manufacturing the thermistor element according to claim 1, comprising:
an interlayer-forming step of forming a conductive interlayer on the thermistor body formed of the thermistor material; and
an electrode-forming step of forming an electrode layer on the conductive interlayer,
wherein the interlayer-forming step has a step of applying a $RuO_2$ dispersion liquid containing $RuO_2$ grains and an organic solvent onto the thermistor body and drying the $RuO_2$ dispersion liquid to form a $RuO_2$ layer and
a step of applying a silica sol-gel liquid containing $SiO_2$, an organic solvent, water, and an acid onto the $RuO_2$ layer and drying the silica sol-gel liquid in a state in which the silica sol-gel liquid is intruded into the $RuO_2$ layer to form the conductive interlayer,
wherein application of the $RuO_2$ dispersion liquid and application of the silica sol-gel liquid are carried out by a wet-type application method.

* * * * *